United States Patent [19]

Stephen et al.

[11] Patent Number: 4,688,541

[45] Date of Patent: Aug. 25, 1987

[54] ATTACHMENT FOR BARBECUE GRILL

[75] Inventors: James C. Stephen, Arlington Heights; James E. Tucker, Batavia; John Beecher, III, Carpentersville, all of Ill.

[73] Assignee: Weber-Stephen Products Co., Palatine, Ill.

[21] Appl. No.: 888,879

[22] Filed: Jul. 22, 1986

[51] Int. Cl.⁴ .............................. B28D 1/32; A47B 5/00
[52] U.S. Cl. .................................. 126/25 R; 126/9 B; 108/157; 108/152; 108/159
[58] Field of Search ............. 126/9 B, 9 R, 25 R, 126/333; 108/152, 159, 157, 156; 99/484

[56] References Cited

U.S. PATENT DOCUMENTS

| | | | |
|---|---|---|---|
| 598,895 | 2/1898 | Bell | 108/152 X |
| 1,625,412 | 4/1927 | French | 108/152 X |
| 1,708,424 | 4/1929 | McLeskey | 126/9 B |
| 2,768,042 | 10/1956 | Persinger et al. | 126/9 B X |
| 2,922,529 | 1/1960 | Culbertson | 126/9 B X |
| 2,985,164 | 5/1961 | Imoto | 126/25 R |
| 3,106,296 | 10/1963 | Walsh et al. | 108/159 X |
| 3,683,791 | 8/1972 | Rast, Jr. | 126/25 R X |
| 4,337,751 | 7/1982 | Sampson et al. | 126/9 B X |

Primary Examiner—Randall L. Green
Attorney, Agent, or Firm—Robert E. Wagner; Ralph R. Rath

[57] ABSTRACT

An attachment for a barbecue grill consists of a generally L-shaped support frame that is formed by bending wire to a generally U-shaped configuration with the free ends of the wire having downwardly bent portions that act as hooks for supporting the frame on clips attached to the rim of the grill. A serving board has grooves extending from the lower surface thereon for receiving the rod portions so that the board is securely positioned on the frame and also has gripping openings so that the board can easily be removed for use as a serving tray.

7 Claims, 4 Drawing Figures

U.S. Patent    Aug. 25, 1987    4,688,541
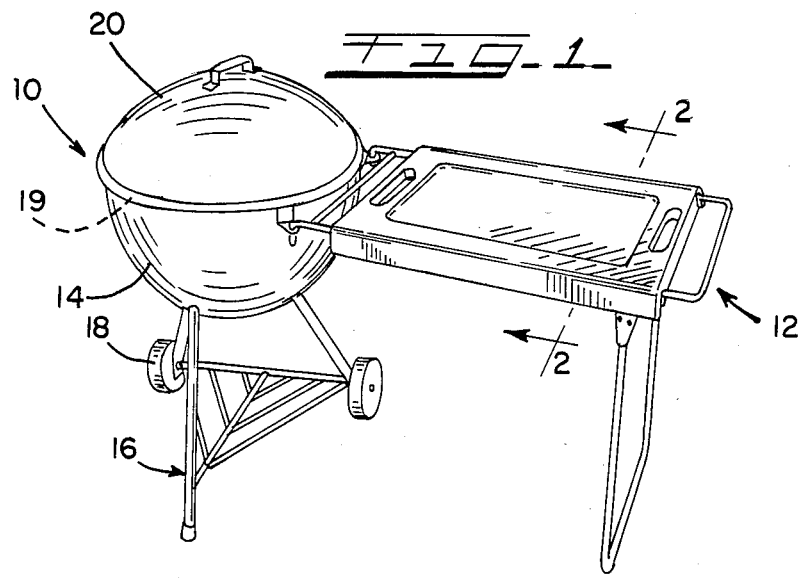
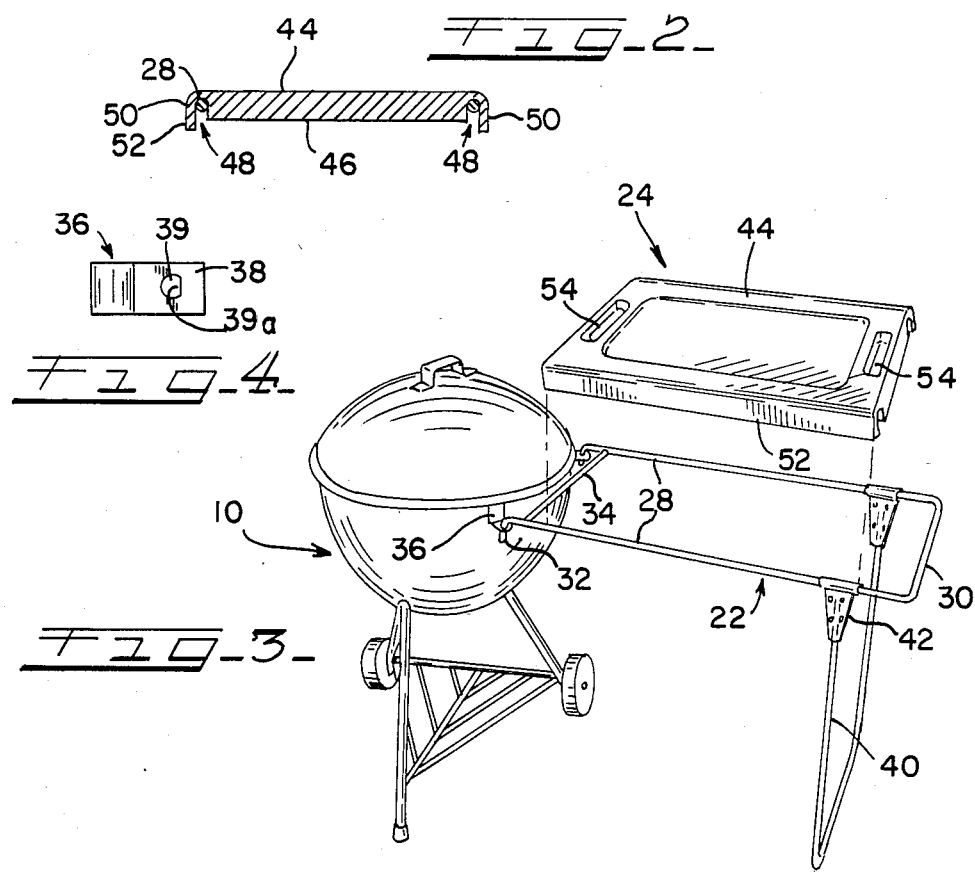

ATTACHMENT FOR BARBECUE GRILL

DESCRIPTION

1. Technical Field

The present invention relates generally to barbecue grill accessories and more particularly to an accessory that provides a working surface adjacent the grill that may be removed from the grill for use as a serving tray for food.

2. Background of the Invention

Barbecue grills have become an important item for outdoor cooking. Such grills have a fire bowl for containing hot coals and a metal grid spaced above the coals for supporting the food that is being cooked. One type of grill that has received a remarkable degree of commercial acceptance is a cooking vessel that is marketed by the assignee of the present invention and is commonly referred to as a barbecue kettle. This cooking device consists of a generally hemispherically bowl that has a circular open top with a cooking surface located slightly below the upper edge or rim of the bowl. The bowl is supported in a tripod leg arrangement and has a cover for enclosing the cooking surface.

These barbecue kettles generally do not have any surface for supporting such items as the food that is being prepared, contiments and the like. Thus, various accessories have been developed for providing a working surface or storage space adjacent the grill. Many of these devices or attachments are supported directly on the upper rim of the hemispherical bowl to be close to the cooking surface.

One type of such attachment is disclosed in U.S. Pat. No. 4,337,751 which includes a wire frame having a pair of clips which fit over the lip of the kettle and support the hanging wire on the grill in a generally cantilever fashion. A wooden work surface rests on the wire support and can be lifted from the support for use as a cutting board or a serving tray. However, the accessory disclosed in this patent has a peculiar shape since it is designed to fit close to the exterior surface of the curved wall of the kettle and thus may become overheated during the cooking process.

SUMMARY OF THE INVENTION

According to the present invention, an outdoor grill attachment having a removable work surface in the form of a tray table which is generally rectangular and is supported on an inexpensive wire frame in a position spaced from the surface of the grill.

The support frame consists of a rod that is bent to a generally U-shaped configuration to define a pair of spaced parallel legs with the ends of the rods being bent downwardly to form hooks which can be supported on clips attached to the lip or rim of the grill. The frame includes a second rod that is again bent to a U-shaped configuration and has opposite free ends connected to the parallel legs of the horizontal frame portion of the frame structure.

The clips are generally U-shaped in cross-section to provide an interference fit over the rim and have a horizontal outwardly-directed flange which has a circular opening therein. The circular opening has a flat chordal portion to provide an interference fit with the circular rod.

A generally rectangular serving board is supported on the spaced parallel legs and has elongated parallel grooves in a lower surface thereof which receive the spaced parallel legs of the frame. The serving board has gripping means in the form of openings adjacent opposite ends of the serving board. The serving board also has downwardly directed lips extending the entire length downwardly from opposite edges of the board which can be utilized as support feet when the serving board is removed from the frame.

BRIEF DESCRIPTION OF SEVERAL VIEWS OF DRAWINGS

FIG. 1 shows a perspective view of an attachment of the present invention supported on a conventional grill;

FIG. 2 is a cross section view as viewed along line 2—2 of FIG. 1;

FIG. 3 is an exploded view similar to FIG. 1; and,

FIG. 4 is a plan view of the clip.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawing discloses a barbecue kettle generally designed by reference numeral 10 having the attachment of the present invention associated therewith and generally designated by reference numeral 12. The barbecue kettle 10 preferably is of the type that is marketed by the assignee of the present invention and the silhouette thereof is a trademark of the assignee of the present invention. The kettle may be of the type disclosed in U.S. Pat. No. 4,416,248 and includes a generally hemispherical bowl 14 supported on a tripod leg arrangement 16 that has wheels 18. The bowl 14 has an upper rim or lip 19 surrounding the opening and a cover 20 is supported on the rim or lip.

The attachment 12 consists of a generally L-shaped wire frame 22 and a serving board or work surface 24. The wire frame 22 is generally L-shaped and consists of a first circular rod that is bent to a generally U-shaped configuration to define a pair of spaced parallel portion or legs 28 and a bite portion 30. The free ends of the legs have bent end portions 32 and are interconnected by a cross brace 34 located adjacent the hook means 32. The hook means 32 are preferably supported on thin, generally U-shaped clips 36 that have horizontal flanges 38 which have an opening therein. The second portion of the L-shaped support frame 22 again consists of a rod 40 bent to a U-shaped configuration and having free ends attached to the spaced parallel legs 28 by suitable brackets 42.

According to one aspect of the present invention, the clips are designed to provide a friction fit with the rim and an interference fit with the rods. As illustrated in FIG. 4, the horizontal flange 38 has a circular opening 39 therein which has a flat chordal portion 39a and the clips are formed of spring metal, such as stainless steel. The clips are configured such that the U-shaped portion frictionally grips the rim of the bowl while the opening is sized so that the chordal portion 39a produces an interference fit with the circular bent end portion 32.

Thus, the clips can be fitted over the rim of the lower bowl 14 and the frame can easily be assembled by telescoping the bent end portions 32 into the openings 39 in the horizontal flanges 38 of the clips 36 to secure the frame to the kettle.

The serving board or work surface 24 is a generally rectangular member that has a top surface 44 which defines the work surface adjacent the grill 10 and a lower surface 46. As illustrated in FIG. 2, the lower surface 46 has a pair of elongated parallel grooves 48 that extend the length of the board adjacent opposite edges 50. The serving board 24 also has downwardly directed lips or elements 52 extending from opposite edges 50 below the lower surface 46 outside the groove to define support feet to be used when the board is removed from the frame 22. The serving board also has gripping means in the form of openings 54 adjacent opposite ends and the feet 54 position the lower surface 46 above the supporting surface. The board 24 also has a recessed center portion 56 to collect juices that flow from the food that is being supported thereon.

The frame structure of the present invention is inexpensive to manufacture and can be attached to the grill very conveniently and quickly. Once attached to the grill, the support frame defines generally horizontal legs 28 and a generally vertical leg 40 and the serving board can be telescoped over the horizontal frame portion with the parallel legs 28 being received into the grooves so that the board is securely held in a fixed position on the frame. It should be noted that the horizontal leg of the support frame 22 is longer than the length of the board 24 so that the inner edge of the board is spaced from the peripheral surface of the grill and thus overheating of the board is prevented.

Also, the use of the clips that are not fixed to the frame allows the frame to be attached to grills having different diameters since the opening 39 will accomodate the hooks in any angular position.

Of course various modifications come to mind without departing from the spirit of the invention. For example, the clips or brackets 42 could easily be designed so as to be readily removable so that the frame structure could be stored in a compact space when not being used. Also, the U-shaped support leg 40 could be pivotally supported on the horizontal frame 36, if desired.

We claim:

1. An attachment for a barbecue grill comprising a generally U-shaped frame having a pair of generally parallel legs with free ends thereof having hook means adapted to be supported on said barbecue grill and depending support means adjacent an opposite end of said frame so that said frame is supported in a generally horizontal position adjacent said barbecue grill and a generally rectangular serving board supported on said frame, said serving board having opposite edges and opposite ends with an exposed surface defining a work surface between said edges and an opposite surface with said opposite surface having grooves receiving said generally parallel legs, said serving board having depending integral feet extending from said opposite surface below said opposite surface and gripping openings adjacent said opposite ends so that said serving board can be telescoped onto said frame with said legs received into said grooves and can be removed by gripping said openings and can be supported by said feet to be used as a serving tray.

2. An attachment as defined in claim 1, in which said U-shaped frame is formed from a circular rod and said hook means consists of a bent end portion on each of said legs.

3. An attachment as defined in claim 2, further including a cross-brace extending between said legs adjacent said free ends.

4. An attachment as defined in claim 2, in which said support means includes a U-shaped support rod having free ends attached to said legs.

5. An attachment as defined in claim 2, in which said grill consists of a circular bowl which has a peripheral rim, further including U-shaped clips adapted to be received over said rim and having horizontal flanges with openings receiving said bent end portions and means providing an interference fit between said bent end portions and said openings.

6. A working surface attachment for a barbecue grill including a bowl having an upper peripheral rim, said attachment comprising a generally L-shaped wire frame having a generally horizontal first leg and a generally vertical second leg, said first leg being defined by a circular rod bent to a U-shaped configuration to produce spaced parallel portions having free ends angularly offset to define hooks, a pair of U-shaped clips adapted to fit over said rim and having outwardly-extending flanges having openings therein receiving said hooks, and a rectangular serving board having an exposed surface defining a work surface adjacent said barbecue grill and an opposite surface with said opposite surface having spaced parallel grooves adjacent opposite edges receiving said spaced parallel portions, said serving board having gripping means adjacent opposite ends so that said serving board can be telescoped over said first leg and be supported by said spaced parallel portions of said rod and can be removed and used as a serving tray and in which said serving board has depending elements integral with opposite edges that extend below said opposite surface and define support feet for said serving tray.

7. A working surface attachment as defined in claim 6, in which said openings in said clips have means defining an interference fit with said hooks.

* * * * *